June 21, 1927.
J. B. HIRD
1,633,018
MACHINE FOR LINING BRAKES AND CLUTCHES
Filed Oct. 17, 1922
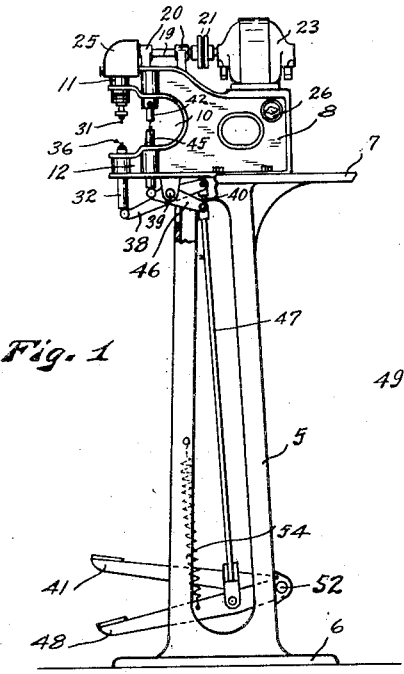
Fig. 1
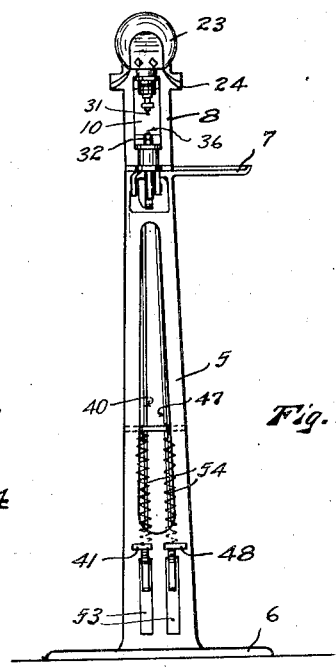
Fig. 2
Fig. 4
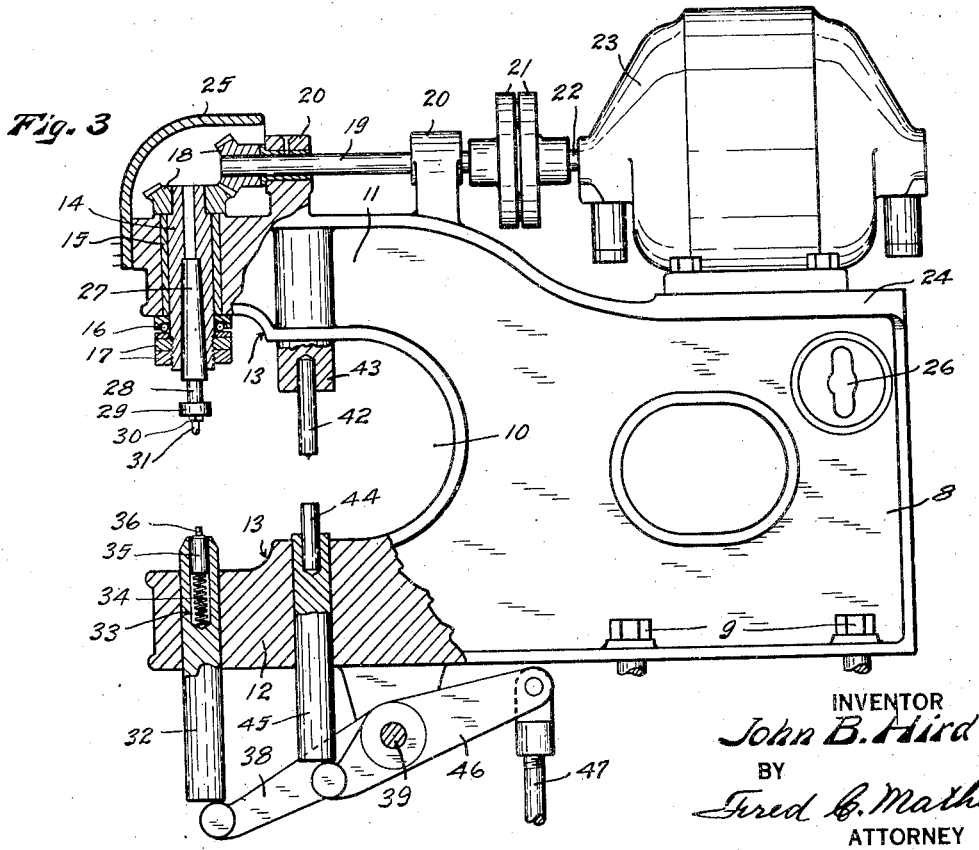
Fig. 3
INVENTOR
John B. Hird
BY
Fred C. Matheny
ATTORNEY Patented June 21, 1927.

1,633,018

UNITED STATES PATENT OFFICE.

JOHN B. HIRD, OF SEATTLE, WASHINGTON, ASSIGNOR, BY DIRECT AND MESNE ASSIGNMENTS, TO IDEAL BRAKE RELINER COMPANY, OF SEATTLE, WASHINGTON, A CORPORATION OF WASHINGTON.

MACHINE FOR LINING BRAKES AND CLUTCHES.

Application filed October 17, 1922. Serial No. 595,037.

My invention relates to improvements in machines for lining brakes and clutches, and the primary object of my improvement is to provide a machine of this nature in which a drill press and a riveter are combined into a single compact and inexpensive unit that will greatly lessen the time and labor required in lining or relining brakes and clutches and that will perform the work in a more efficient and satisfactory manner than it can be performed by ordinary hand methods.

Another important object of the invention is to provide a machine of this nature by which an old and worn lining may be quickly and easily removed from a clutch or brake band.

Another important object is to provide a drill press having a receding or resiliently supported pin that is arranged to enter and fit snugly within a hole in a band to accurately align the hole in a band with the drill and countersink tool before the lining is drilled, thus insuring that the hole in the lining will be in perfect alignment with the hole in the band, the drill entering the hole in the band and crowding the receding pin back but being accurately centered so that it will not cut the edges of the hole in band as it might do if not properly centered.

Another important object is to provide a device of this nature in which the drilling and countersinking of a hole in a lining is done at one operation and the clinching of a rivet is done at one stroke of a foot pedal.

Further objects are to provide a machine of this nature that is strong and simple in construction, reliable and efficient in operation, neat and ornamental in appearance and comparatively cheap to manufacture.

Other and more specific objects will be apparent from the following description taken in connection with the accompanying drawings.

The device is intended primarily for use in connection with clutches and brake bands, either new or used, that are already perforated for the reception of the rivets and in which the brake linings must be drilled and countersunk to conform to the perforations in the clutch or brake band. It will be understood however that the device may be adapted to other uses.

In the drawings Figure 1 is a view in side elevation of a brake and clutch lining machine constructed in accordance with my invention.

Fig. 2 is a view in front elevation of the same.

Fig. 3 is an enlarged view partly in side elevation and partly in cross section showing the machine removed from the pedestal or support.

Fig. 4 is a view in perspective of an attachment that may be used to facilitate the removal or punching out of old rivets in relining bands.

Referring to the drawings, throughout which like reference numerals designate like parts, I have shown one preferred embodiment of my invention but it will be understood that the disclosure is merely illustrative and that the various changes may be resorted to without departing from the scope and spirit of the invention.

In the drawings 5 designates a pedestal having a base 6 and having at its top end a shelf like portion 7 that forms a tray whereon work and material may be placed and a support on which the machine proper may be mounted.

The machine comprises a frame 8 arranged to be secured to the support 7 by bolts 9 and having at its forward end an indentation or recess 10 leaving a forwardly protruding upper portion 11 and a forwardly protruding lower portion 12, the distance between adjacent surfaces of the portions 11 and 12 being greater at the outermost extremity of the recess 10 and being lessened toward the innermost end of the recess by the formation of curved shoulders 13.

The drill and countersink mechanism comprises a drill socket 14 journaled in a bushing 15 in the outer end of the upper frame portion 11 and provided at its lower end with a ball thrust bearing 16 and with adjustable lock nuts 17. The drill socket 14 is connected at its upper end by bevel gears 18 with a horizontal shaft 19 that is mounted in suitable bearings 20 on the frame 8 and is connected by a flexible coupling 21 with the main shaft 22 of a motor 23 which is secured to a motor base or support 24 on the frame 8. A housing 25 is provided for the bevel gears 18.

The supply of current to the motor 23 may be controlled by a switch 26 on the side of the frame 8.

The drill socket 14 is provided with a taper bore for the reception of a standard taper drill shank 27. A combined drill and countersink tool is arranged to be inserted in the drill shank 27, such tool comprising a shank 28, an enlarged stop member 29, a countersink bit 30 and a drill bit 31 arranged so that the drill bit will first bore the hole, the countersink bit will then countersink one end of the hole and the stop member will arrest the cutting operation of the countersink bit when it reaches the proper depth.

Reciprocably mounted within the lower frame member 12 in axial alignment with the drill and countersink is a drill guide or work lifting member 32, having at its upper end a socket 33 wherein is disposed a compression spring 34 that yieldingly supports a reciprocably disposed hole finding and centering device comprising a larger cylindrical stem 35 having an axially arranged pin member 36 on the upper end.

The work lifting member 32 rests upon the rounded outer end of a lever arm 38 that is fulcrumed on a pivot 39 and has its outer end connected by a link 40 with a foot pedal 41 which may be depressed to elevate the member 32.

The rivet clinching mechanism comprises a clinching or riveting member 42 rigidly mounted in a depending lug 43 on the upper frame portion 11 and a punch element made up of a die 44 carried in a cylindrical socket member 45 that is reciprocably supported within the lower frame portion 12 in axial alignment with the clinching member 42. The lower end of the member 45 rests upon the rounded forward end of a lever arm 46 that is fulcrumed on the pivot 39 and has its rear end connected by a link 47 with a foot pedal 48 in such a manner that when the foot pedal 48 is depressed the punch member will be raised.

When the riveting apparatus is to be used for removing old rivets from worn brakes and clutches, the clinching member 42 will be removed and replaced by an attachment, see Fig. 2, comprising a cylindrical body portion 49 having a relatively large deep longitudinal slot 50 and provided with a shank 51 arranged to fit within the socket in the lug 43, the slot 50 being large enough to permit an old rivet to be punched out therethrough when a band is placed between it and the punch 44 with the rivet in the correct alignment and the punch forced upwardly by depressing the foot pedal 48.

Another and a preferred method of removing rivets, especially tubular rivets, from old work is to place the work in the machine and run the drill and countersink bit down into the tubular end of the old rivet thus tearing out the old rivets very quickly. Solid rivets may also be removed in this way by drilling out the riveted or clinched parts.

The foot pedals 41 and 48 are fulcrumed on a common pivot 52 at the rear of the pedestal 5 and extend forwardly through slots 53 in the front walls of such pedestal, the upper ends of which slots serve as stops to limit the upward movement of the pedals. The pedals are urged upwardly by tension springs 54.

In operation when the machine is used for relining old brakes and clutches the old rivets and lining are first removed, new lining material is then secured in the correct position within or on the band, the band is then placed on the member 32 and moved about until the pin 36 enters a hole in the band at the location where the lining is to be drilled. The motor 23 having been started the pedal 41 is then depressed to lift the member 32 and elevate the brake lining against the rotating drill and countersink tool which will drill through said brake lining and countersink the upper end of the hole sufficiently to receive the head of a rivet. The distance that the countersink bit 30 projects from the stop member 29 will determine the depth that the hole will be countersunk. If desired the stop member 29 may be dispensed with and operator may countersink the holes to any depth he desires.

The pin 36 will fit snugly within the hole in the band and align such hole accurately with the drill. When the drill pierces the lining it will strike the pin 36 and cause the pin to recede into the socket 33 against the yielding pressure of the spring 34. In this way the receding pin 36 makes it possible to insure accurate alignment between a hole in the band and a hole that is being drilled in the lining.

After the holes are drilled the band may be turned over and rivets inserted in the holes and clinched or riveted by placing the head of the rivet on the punch member 44 and depressing the pedal 48 thereby forcing the rivet upwardly against the clinching member 42.

The operation of affixing brake linings to new bands that are drilled for the reception of rivets will be the same as hereinabove described except that there will be no old rivets and lining to remove.

By combining the drill press and riveter into a single machine I am able to produce an article that can be manufactured cheaper than the two devices could be manufactured separately and am further able to produce a machine with which an operator can turn out uniform work of high quality with much less labor and in much less time than it is possible to do by ordinary hand methods.

It will be understood that changes in the form, dimensions and arrangement of parts of the device may be made within the scope of the following claim.

What I claim is:

A machine of the class described embodying a frame having a U shaped recess extending inwardly from the front edge thereof, rotary drill and countersink devices journaled in said frame and projecting downwardly into said recess near the open end thereof, a work elevating device slidably mounted in said frame and arranged to project upwardly into said recess in alignment with said drill and countersink devices, means for driving said drill and countersink devices, means for lifting said work elevating device, rivet clinching devices operatively mounted in said frame and projecting into said recess, to the rear of said drill and countersink devices and means for operating said rivet clinching devices.

JOHN B. HIRD.